No. 805,754. PATENTED NOV. 28, 1905.
E. W. RIDER.
MACHINE FOR PRESSING PLASTIC MATERIAL.
APPLICATION FILED FEB. 13, 1905.
5 SHEETS—SHEET 5.
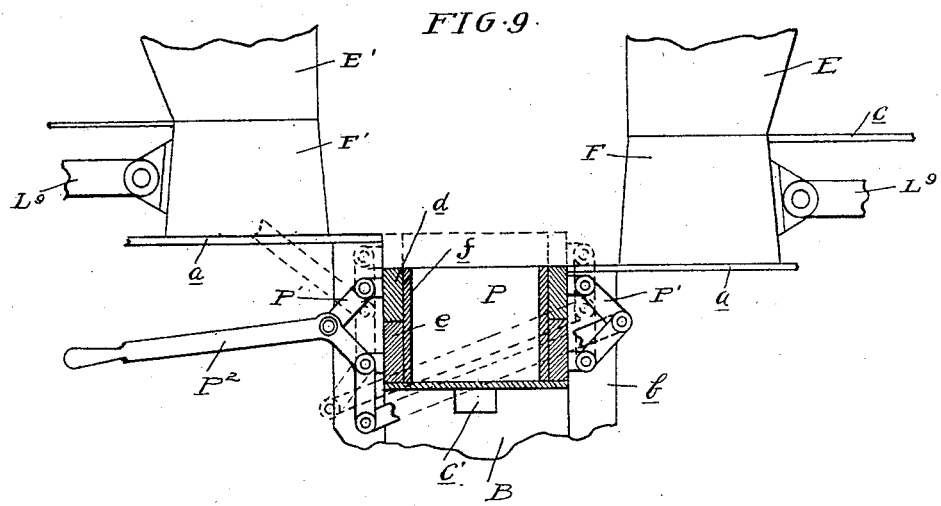
FIG. 9.
FIG. 10. FIG. 11.
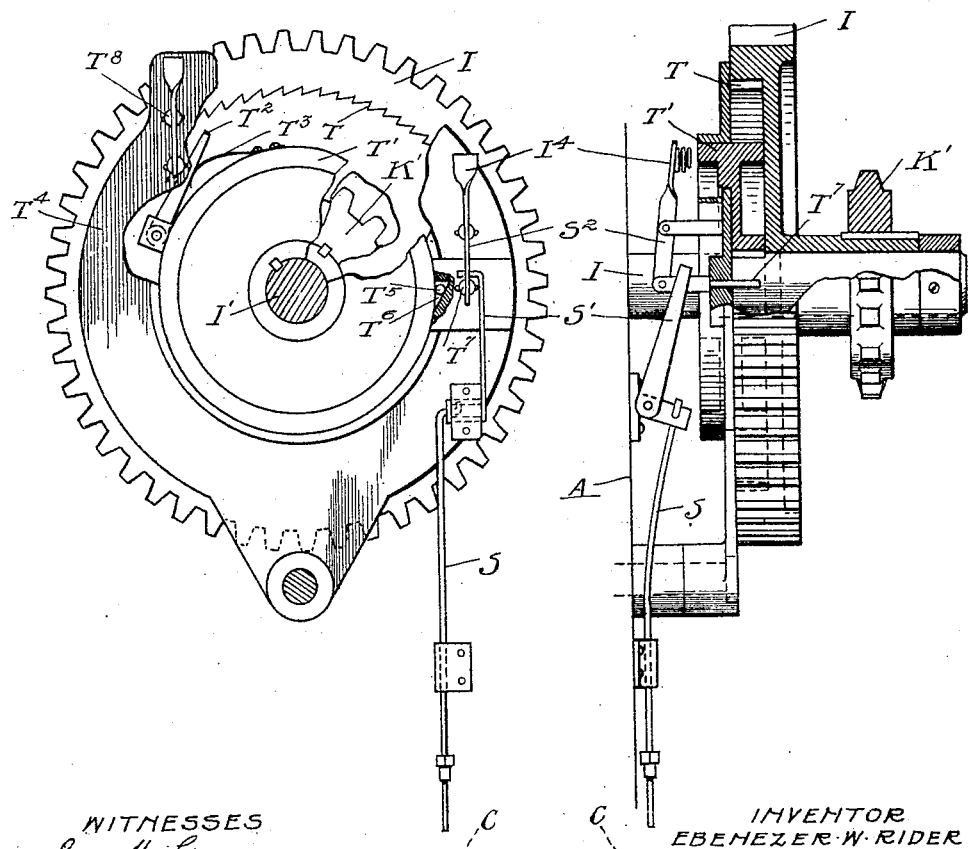
WITNESSES
INVENTOR
EBENEZER W. RIDER
ATT'Y.

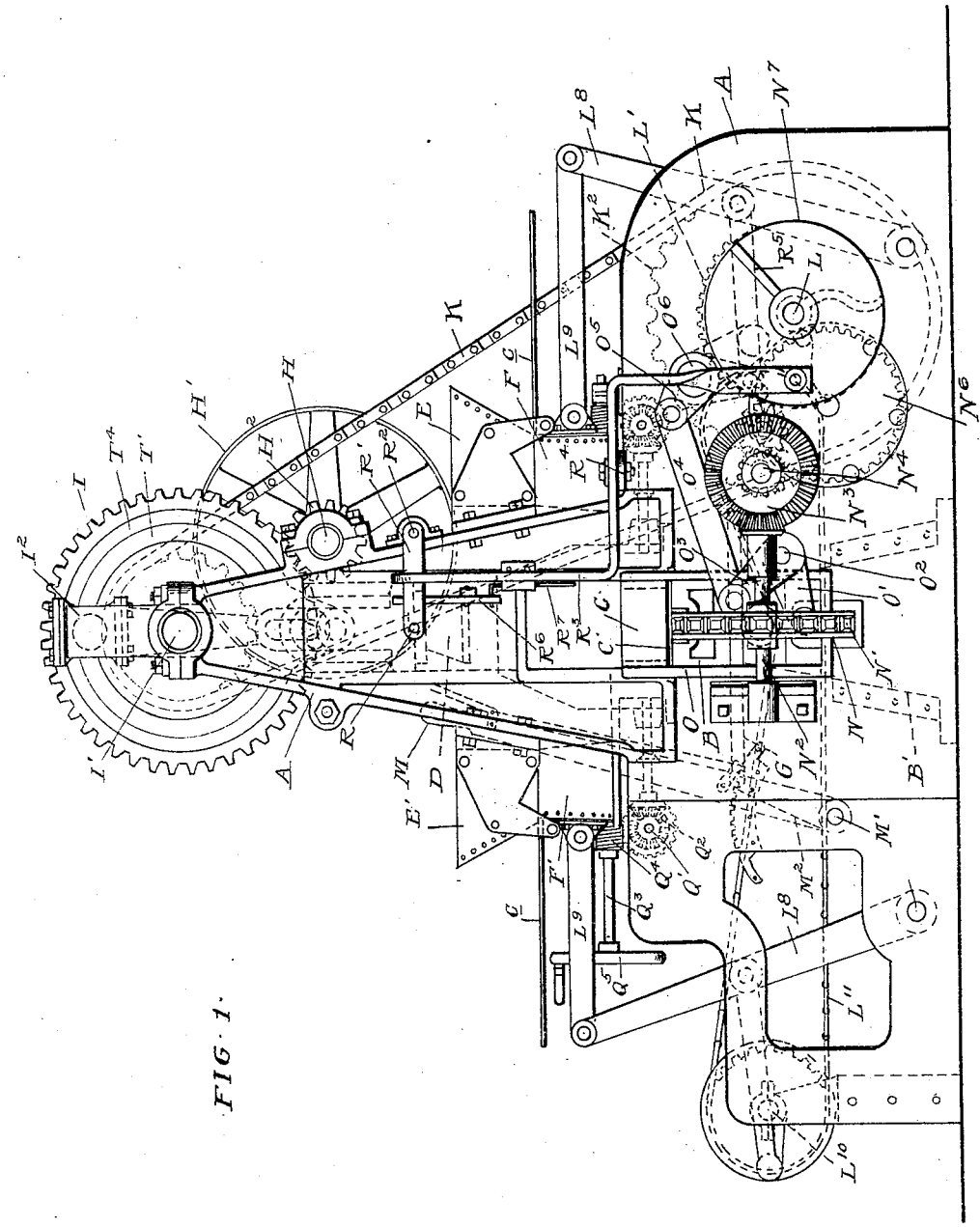

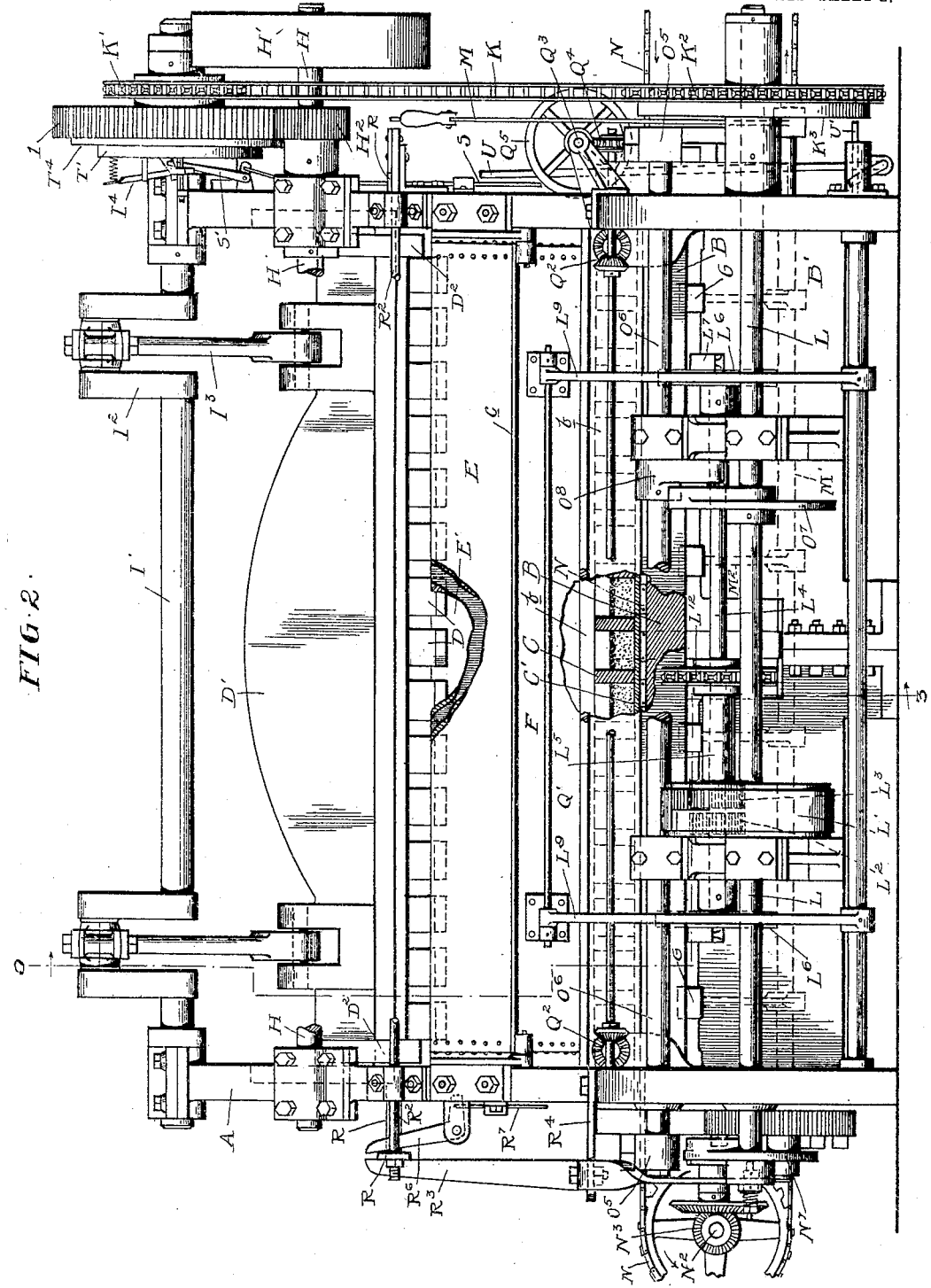

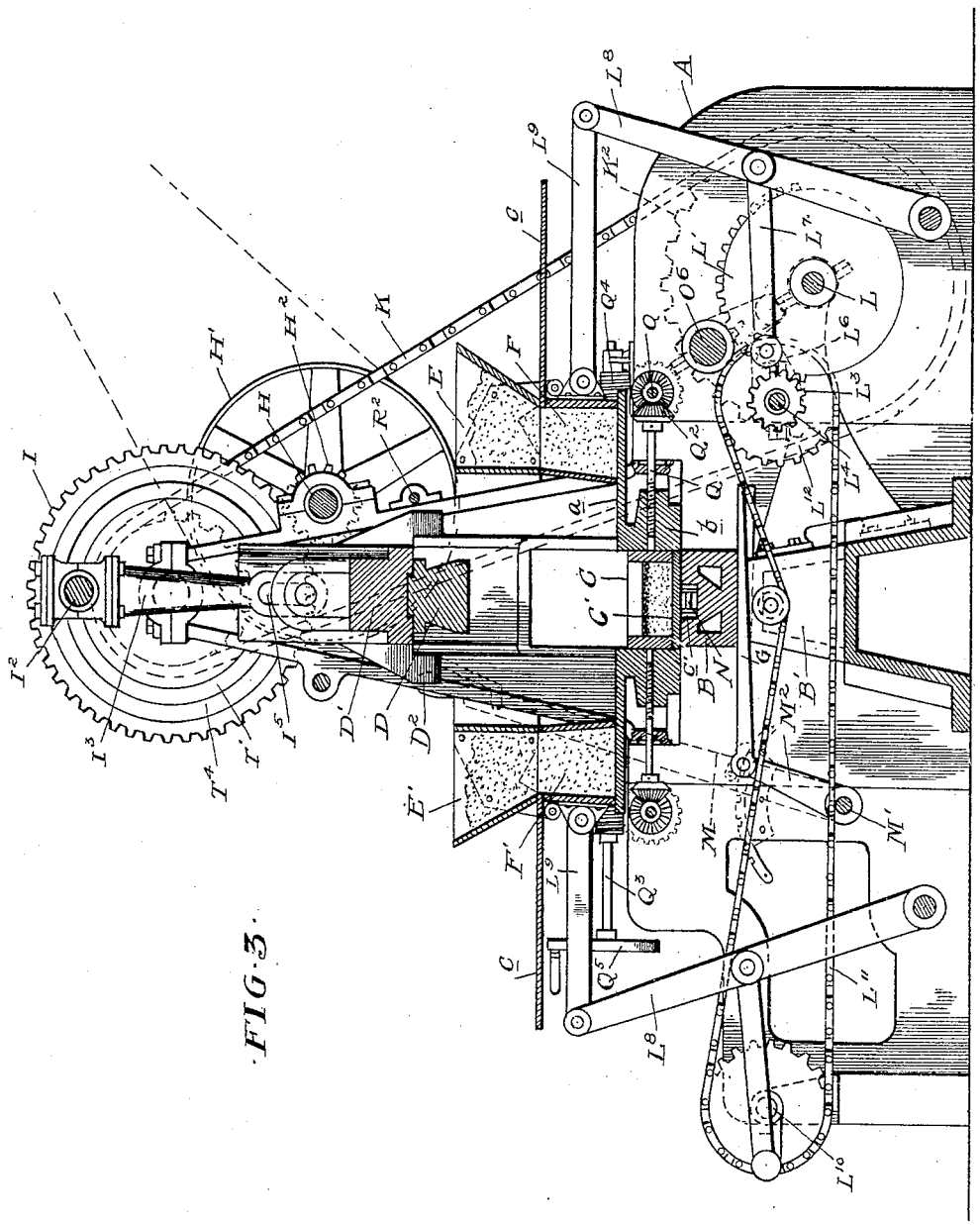

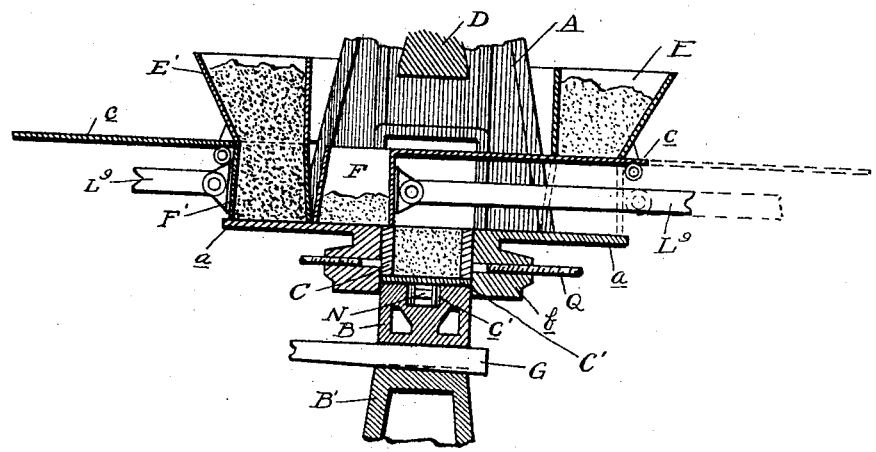
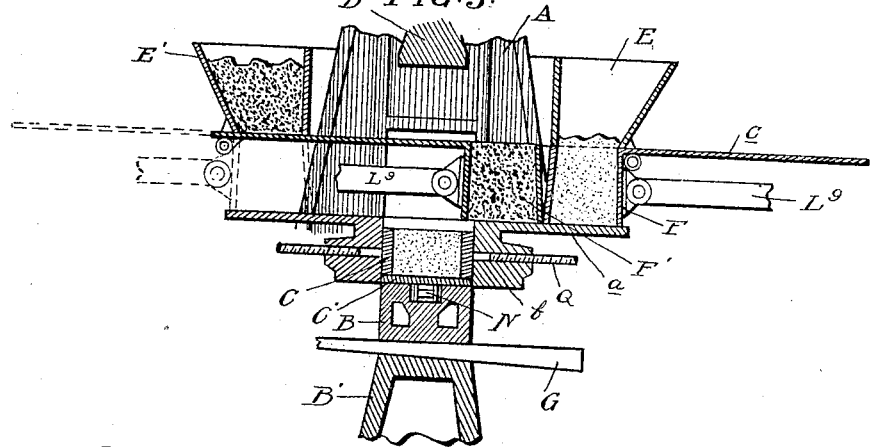
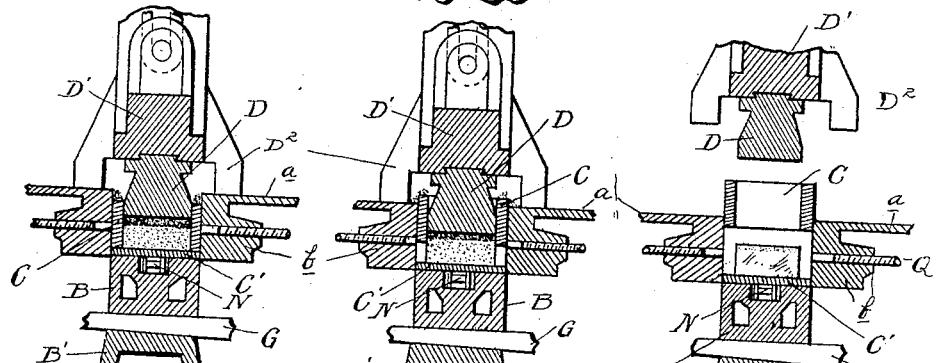

UNITED STATES PATENT OFFICE.

EBENEZER W. RIDER, OF DETROIT, MICHIGAN, ASSIGNOR TO CONCRETE MACHINERY COMPANY, OF DETROIT, MICHIGAN, A CORPORATION OF MICHIGAN.

MACHINE FOR PRESSING PLASTIC MATERIAL.

No. 805,754.      Specification of Letters Patent.      Patented Nov. 28, 1905.

Application filed February 13, 1905. Serial No. 245,495.

*To all whom it may concern:*

Be it known that I, EBENEZER W. RIDER, a citizen of the United States, residing at Detroit, in the county of Wayne and State of Michigan, have invented certain new and useful Improvements in Machines for Pressing Plastic Material, of which the following is a specification, reference being had therein to the accompanying drawings.

The invention relates to machines for pressing plastic material, particularly designed for the formation of bricks and other like articles.

The invention consists in certain novel features of construction, as hereinafter set forth.

In the drawings, Figure 1 is an end elevation of the machine. Fig. 2 is a side elevation thereof, partly in section. Fig. 3 is a central cross-section on line 3 3, Fig. 2. Figs. 4, 5, 6, 7, and 8 are sectional views of portions of Fig. 3, illustrating the mode of operation of the machine. Fig. 9 is a diagrammatic view illustrating a modification. Fig. 10 is a sectional elevation of the clutch controlling the operation of the plunger, and Fig. 11 is a sectional elevation viewed at right angles to Fig. 10.

In the present state of the art a plastic mixture of sand and cement is used in the manufacture of brick, building-blocks, and other various articles, and in the manufacture of such articles it is essential that the material be molded under considerable pressure. When molded, the material possesses very little tenacity, and extreme care must be taken to prevent destroying the shape in removing from the mold. The present invention is designed to facilitate the rapid molding of the bricks and the removal thereof through the molds without danger of breakage. The machine is also adapted to be quickly adjusted for the molding of other articles than bricks—as, for example, long bars suitable for use as fence-posts.

In general construction the machine comprises a suitable framework A, in which are mounted the various parts of the mechanism, a vertically-adjustable mold-bed B, molds C normally resting thereon, and a plunger D, the latter being arranged to drop upon the plastic material within the molds and to compress the same by the force of its impact. In addition to these parts the machine is provided with hoppers E E' for holding the plastic material and reciprocating carriers F F' for transferring the plastic material from the hoppers to the molds. Thus in normal operation the sequence of movements is first the reciprocation of the carriers F F' above the molds upon the bed to deliver the plastic material thereto while the plunger D is raised, then the removal of said carriers and the dropping of the plunger to compress the loose material in the mold into bricks of the required density.

One of the features of my invention is the construction by which bricks may be formed having a body composed of one material and a thin facing of a different material. To this end the two hoppers and the two carriers E E' and F F' are employed, the one for the body material and the other for the facing, the detailed construction being as follows: The carriers F F' are slidingly supported upon suitable bottom plates $a$, which extend laterally from opposite sides of the mold and are preferably integrally formed on the longitudinally-extending bars $b$, forming lateral supports for the mold. The carriers are also provided with shelves or aprons $c$, projecting oppositely therefrom and adapted during the travel of the carrier to pass beneath the hoppers E E', forming a closure for preventing the escape of the plastic material therein. In the constructions shown in Figs. 3, 4, and 5 the carriers F F' are arranged to be reciprocated in the same horizontal plane, and their operating mechanism is so timed that the carrier F is first moved across the plate $a$ and over the mold C, and then in its return movement the hopper F' is caused to travel simultaneously across the mold in the opposite direction, being finally returned to its initial position.

During the forward movement of the carrier F across the mold the plastic material will drop from the carrier to fill the mold, the upper face of which is on a level with the plate $a$. During the return movement of this carrier and the forward movement of the carrier F' no further material is deposited in the mold, for the reason that it has been completely filled by the first operation. To permit of depositing the facing material in the mold, means is provided for lowering the mold after the completion of the return stroke of the carrier F and the forward stroke of the carrier F', but before the return stroke of the latter. To this end, the bed B is slightly depressed by suitable means, such as the partial withdrawal of supporting-wedges G, and with it is lowered the mold C, so as to leave a shallow space between the upper edge of the mold and the level of a top face of the plate $a$. Thus in the return stroke of the carrier F' the mold therein will drop to fill this space, leaving a thin upper facing material above the body material in the mold.

For accomplishing the movements above specified, as well as the subsequent operation of the compressing-plunger, suitable timed mechanism is provided, preferably of the following construction: H is the main driveshaft which receives rotary motion from a pulley H', mounted thereon and connected to any suitable source of power. $H^2$ is a pinion upon the shaft H, which meshes with the gear-wheel I, sleeved upon a shaft I', extending longitudinally of the machine and journaled in bearings in the upper part of the frame. The shaft I' is provided with a pair of cranks $I^2$, which are connected by rods $I^3$ with a vertically-slidable frame D', to which the plungers D are attached. $I^4$ is a clutch of any suitable construction which is arranged adjacent to the gear-wheel I and adapted to couple said gear-wheel at certain times to the crank-shaft I'. K is a sprocket-chain connected to a sprocket K', fixed to the gear-wheel I and with the sprocket $K^2$ upon the shaft L, extending longitudinally of the frame and journaled in bearings in the lower portion thereof. The sprocket $K^2$ is sleeved upon the shaft L and only periodically coupled therewith through the medium of a clutch $K^3$, the detailed construction of which is not illustrated. The shaft L has mounted thereon the wheels L', having interrupted gear-segments thereon adapted to mesh with a pair of pinions $L^2$ $L^3$, the former secured to a shaft $L^4$ and the latter to a sleeve $L^5$ upon said shaft. $L^6$ represents cranks upon the shaft $L^4$, connected with pitmen $L^7$ with vertically-extending levers $L^8$, fulcrumed in the frame. The free ends of these levers $L^8$ are connected by links $L^9$ with the carrier F. The carrier F' is similarly connected by links and levers on the opposite side of the machine and with the crank-shaft $L^{10}$, the latter being connected by a sprocket-and-chain connection $L^{11}$ with the sprocket $L^{12}$ on the sleeve $L^5$. Thus in the operation of the machine whenever the shaft L is rotated movement will be imparted to the carriers F F' through the mechanism described, and the interrupted gear-segments upon the wheel L are so positioned as to produce the timed operations of the carriers, as has been described. The plungers are operated by the release of the clutch $I^4$, which permits the crank-shaft I' to revolve and the slidable frame D' to drop. The lowering of the bed and mold to receive the facing material may be accomplished by timed automatic mechanism; but, as illustrated, this is done by hand through the medium of a lever M operating a rock-shaft M', having rock-arms $M^2$ thereon, which are connected to the wedges G, which raise and lower the bed B.

Another feature of my invention is the peculiar means employed for disengaging the bricks which have been molded from the mold C and for removing them from the machine without danger of breakage. This is accomplished by providing pallets or removable bottom plates C' for the molds, which rest directly upon the beds B during the compression of the plastic material, but which are periodically caused to travel longitudinally of the machine in or out of alinement with the molds. The pressed brick are detached from the mold while resting upon the pallets C' and after being completely disengaged the pallets are fed outward from the machine, carrying the brick thereon.

N is a sprocket-chain which travels through a groove $c'$ in the bed B and passes about a drive-sprocket N' at one end of the machine. This sprocket, as shown, is mounted upon a shaft $N^2$, connected by bevel gear-wheels $N^3$ to a shaft $N^4$ and by a pinion $N^5$ on the latter to an intermittently-rotating star-wheel $N^6$. This star-wheel is periodically operated by a coöperating wheel $N^7$ upon the shaft L. Thus during a certain portion of the revolution of the shaft L the coöperating wheels $N^6$ and $N^7$ will impart a partial rotation to the latter, which communicates motion through the intermediate mechanism to the sprocket-wheel $N^3$ and drives the chain N. This chain is provided with dogs at certain intervals, which engage with the pallets C' and move them longitudinally over the bed B.

The disengagement of the molded bricks from the molds is effected while the plungers D are in their lowered position by the upward movement of the mold C, the pallet and bed remaining stationary. As shown in Fig. 1, the opposite ends of the mold C are connected with frames O, secured for vertical reciprocation in bearings upon the frame A. The lower ends of these frames O are connected by rock-arms O' with the rock-shafts $O^2$, having actuating rock-arms $O^3$, connected by links $O^4$ with rock-arms $O^5$ on a rock-shaft $O^6$. The latter shaft extends parallel to the shaft L and is actuated periodically by a cam $O^7$ on the shaft L, coöperating with a rock-arm $O^8$ on the shaft $O^6$. Through this mechanism the molds C are raised and lowered, and the timing is such that the molds are lifted while the plungers, pallet, and bed are stationary. Thus the shape of the molded bricks is preserved during disengagement of the molds.

Immediately following the raising of the mold C the plungers D are lifted by the rotation of the crank-shaft I' and cranks I², after which motion is imparted to the chain N, as has been described, and the pallet is fed longitudinally over the bed, moving the bricks thereon. This same movement feeds into the machine another pallet into position for registration with the mold C.

As a modification of the construction for placing the facing material in the molds I may employ the device shown in Fig. 9, in which P is a mold-box formed in two superposed sections $d$ $e$ and provided with a lining or inner facing $f$. This mold normally rests upon a fixed bed B', and after the movement of the carrier F across the mold to fill the same with the body material the upper section $d$ is slightly raised, while the lower section $e$ and lining $f$ remain stationary. This will furnish the additional space within the mold for the reception of the facing material, which is deposited therein from the carrier F', as in the construction previously described. It is necessary, however, with this construction to have the carrier F' arranged on a slightly-higher plane than the carrier F, so that it will clear the top of the mold-section $d$ when the latter is raised. The raising of the section $d$ may be accomplished by any suitable mechanism, such as the toggles P', operated by the hand-lever P².

The machine as thus far described is adapted for the simultaneous formation of a series of bricks in the mold C and by slight adjustments other forms may be also molded on this machine. To this end the bars $b$, which form the lateral supports for the mold C, are laterally adjustable, so that the width of the mold-space above the bed may be altered. As shown, the lateral adjustment of these parts is effected by screws Q, engaging threaded apertures at the opposite ends of the bars and connected for simultaneous operation with shafts Q' through the medium of bevel gear-wheels Q². The shafts Q' in turn are actuated from a common shaft Q³ through worm-gears Q⁴, and the shaft Q³ is provided with a hand-wheel Q⁵, by which it may be rotated. Thus by turning the hand-wheel the bars $b$ may be adjusted toward or from the center of the mold-cavity to accommodate different widths of molds. The machine is also adapted for the molding of concrete bars or posts—such, for instance, as fence-posts. For this purpose the molds C may be removed and a suitable material extending for the entire length of the machine substituted therefor. If it is desired to strengthen the post by embedding metallic members, these may be placed within the mold before the filling with the plastic material. The series of plungers D may, if desired, also be removed and a continuous plunger substituted therefor, and to this end the attachment between the plungers and the vertically-slidable bar D' is preferably formed with a dovetail joint.

It has been stated that the raising of the plunger is effected by the rotation of the crank-shaft I' through the medium of the cranks I² and rods I³. It has been further stated that the lowering of the plunger is effected by gravity and upon the release of the clutch I⁴. For accomplishing these movements in properly-timed relation to the movements of the other parts of the mechanism and also for locking the plunger during the raising of the mold the following mechanism is provided: R represents locking-bolts slidably engaging the frame and adapted to be projected into engagement with a vertically-movable head D', to which the plungers D are secured. R' represents bars connecting the bolts R with a slidable rod R², extending longitudinally of the frame of the machine. R³ is a lever fulcrumed to a bracket R⁴ on the frame, one end of said lever projecting into contact with the bar R' and the opposite end into proximity to the wheel N⁷ on the shaft L. This wheel N⁷ is provided on its face with a cam R⁵, which once in each rotation of said wheel will engage with the lever R³ and rock it, so as to move the bolts R into locking position, this movement occurring when the plunger is lowered. Thus after the plastic material has been compressed within the mold the plunger will be locked and remains in this condition until after the mold C has been raised and freed from the compressed brick. Upon the completion of the upward movement of the mold C the plunger is automatically unlocked through the operation of a bell-crank lever R⁶, engaging with the bar R', said lever being actuated by a vertically-slidable rod R⁷, which is arranged in the path of the upwardly-moving mold C. The upward movement of the mold C also automatically effects the raising of the plunger after it is released by the unlocking of the bolts R. This is accomplished by a vertically-movable rod S, one end of which extends into the path of the mold and the other end being connected, through the medium of a bell-crank lever S', with a trip S² for engaging the clutch I⁴, and thereby communicating motion to the shaft I', cranks I², and pitman-rods I³. The rotation of the cranks will lift the head D' and plungers D thereon to a point near the upper dead-center of the crank, where the clutch is automatically released and the plungers are held in raised position.

The clutch I⁴ may be of any suitable construction; but, as illustrated, it comprises a ratchet-wheel T, preferably formed on the interior of the gear-wheel I, which wheel is loosely sleeved upon the shaft I'.

T' is a head within the ratchet-wheel T, which is fixed to the shaft I', and T² is a dog pivotally connected to the head T' and pressed outward by the spring T³.

T⁴ is a face-plate, which is secured to a frame A and closes the space around the head T'.

T⁵ is a dog which prevents the backward rotation of the head T', which, as shown, is formed by a roller engaging a wedge-shaped recess T⁶ in the plate T⁴ and also contacting with the periphery of the head T'.

T⁷ is a pin connected with the trip-lever S² and slidable in bearings in the plate T⁴ into the path of the dog T² when rotating with the wheel T. T⁸ is a similar pin arranged in a different location, but also projecting into the path of the dog T².

The arrangement just described is such that whenever the dog T² is rotated it will be automatically thrown into engagement with the ratchet-wheel T by a spring T³. This will cause the coupling of the head T' with the rotating ratchet-wheel and the two will rotate together until the dog T² is disengaged from the clutch. This disengagement occurs whenever either of the pins T⁷ or T⁸ are in the path of the dog. Thus the movement of the head T' and the shaft I', to which it is attached, is intermittently arrested at two different points in its rotation.

As has been described, the raising of the mold C effects, through the medium of the rod S, bell-crank lever S', and trip S², the withdrawal of the pin T⁷, which permits the engagement of the dog T² with the ratchet-wheel and rotates the shaft I' sufficiently to raise the plungers D. This movement is arrested by the engagement of the dog T² with the pin T⁸, so that the shafts remain stationary until this pin T⁸ is withdrawn, whereupon the shaft is again rotated. As soon as the upper dead-center of the crank is passed the weight of the plungers and the head T' will cause them to descend in or out of engagement with the ratchet-wheels, the dog T² slipping engagement therewith. When the downward movement of the plunger is arrested, the dog T² will engage with the ratchet-wheel again, causing the continued rotation of the shaft I' and cranks I²; but in order that the plungers may not be immediately lifted lost motion is provided in the pitman-rods I³ by slitting their lower ends, as at I⁵. Before this lost motion is taken up the pin T⁷ is encountered by the dog T² and the clutch is disengaged, arresting further movement of the shaft. Thus the withdrawal of the pin T⁸ causes the descent of the plunger and the turning of the head T' until the dog T² is in engagement with the pin T⁷, and the operation of raising the mold C automatically trips this pin T⁷, raising the plunger to its initial position.

In the description previously given it has been stated that the clutch K³ periodically couples the sprocket-wheel K with the shaft L. The operation of this clutch is controlled by a lever U, which is fulcrumed on the frame and operates a pin U' for tripping the clutch. The clutch may be of any of the well-known constructions in which when engaged it will impart one complete revolution to the shaft and then automatically disengages, so that the stopping-point is always at the same point in the revolution. If desired, the machine may be provided with connecting mechanism by which the entire cycle of operations may be performed automatically; but, as illustrated, the machine is not completely automatic and requires for each operation that the operator should first move the lever U to impart movement to the shaft L and then after the completion of the automatic movements caused by the rotation of the said shaft L with the clutch I⁴ should be operated by the withdrawal of the pin T⁸. The sequence of automatic operations effected by these two manual operations is as follows: In the initial position the plunger is lowered first after the plastic material has been placed in the mold. When the lever U is connected to trip the clutch K³, motion is imparted to the shaft L, which through the rotation of the wheel N⁷ and cam R⁵ thereon first actuates the mechanism for locking the plunger in its depressed position. Following this the cam O⁷ operates the mechanism for raising the mold, and at the completion of the upward movement of said mold the unlocking of the plunger is effected. Simultaneously the rod S is actuated to operate the trip S², which imparts motion to the cranks I² and raises the plunger. Movement is next imparted to the chain through the medium of the coöperating wheels N⁷ N⁶, which removes one pallet from beneath the mold and carries in another one into registration. Following this the cam O⁷ operates to lower the mold, and immediately thereafter the interrupted gear-segments on the wheel L' will cause the successive reciprocations of the carriers F F' to fill the mold-cavity with the two kinds of plastic material, and intermediate the filling of the mold by the body material and the facing material the lever M is manually operated to withdraw the wedges G and lower the bed, pallet, and mold, as has been described. The completion of the reciprocation of the carriers ends the first cycle of automatic movements, and the mechanism is arrested just after the molds are filled and before the operation of the compression-plunger. The latter is thrown into operation by withdrawing the pin T⁸, as has been described, which automatically causes the gravity-actuated descent of the plunger. If one blow is insufficient to fully compress the material in the molds, the trip S² may be manually operated to raise the plunger and the pin T⁸ again manually withdrawn to cause another operation of the plunger, and this operation may be repeated as many times as necessary. Thus at the completion of the second cycle of movements the plastic material has been compressed in the molds and the plunger is in its lowered position. Upon again manually operating the lever U the first cycle is repeated, and during the first operation thereof the mold is disengaged from the compressed brick and the chain is then moved, and with it the pallet, with the finished brick thereon, to simultaneously feed in another pallet.

In order to secure uniform thickness to the bricks, stops are provided for limiting the downward movement of the plunger. These, as shown, are formed by lugs $D^2$, projecting downward from the head or frame D' on opposite sides of the plungers and engaging with the side bars $b$. To receive the impact of the blow by the plunger, the bed B is itself supported upon a stationary bed B', which is formed as a part of the general frame A.

What I claim as my invention is—

1. In a machine for molding plastic material, the combination with a mold, of means for filling said mold with plastic material, means for subsequently depositing a second layer of plastic material above the mold, and a compression-plunger for simultaneously compressing both layers of material.

2. In a machine for molding plastic material, the combination with a mold, of means for completely filling said mold with plastic material, means for superposing and holding a second layer of plastic material above the first deposit and a plunger for compressing both layers within the mold.

3. In a machine for molding plastic material, the combination with a mold, of means for completely filling the cavity of said mold with plastic material, means for extending the mold to vertically enlarge the mold-cavity thereof, means for filling the extended cavity with a second layer of plastic material, and a plunger for compressing both layers in the mold.

4. In a machine for molding plastic material, the combination of a mold, a carrier for plastic material mounted for the lateral reciprocation across said mold to completely fill the same, and a second carrier mounted for reciprocation across the mold subsequent to the operation of the first carrier, and means for enlarging the mold-cavity intermediate the movements of said carriers, whereby a layer of material from the second carrier will be superposed upon the deposit from the first.

5. In a machine for molding plastic material, the combination with a mold, of a vertically-reciprocating plunger, a pitman and a crank connection for actuating said plunger, a drive connection for said crank, and a clutch intermediate said drive and crank, permitting the acceleration of the descent of the plunger by gravity.

6. In a machine for molding plastic material, the combination with a mold, of a vertically-reciprocating plunger a pitman and a crank connection for actuating said plunger, and a lost-motion connection for said pitman, permitting the continued rotation of the crank, after the movement of said plunger is arrested.

7. In a machine for molding plastic material, the combination with a mold, of a vertically-reciprocating plunger, a pitman and a crank connection for actuating said plunger, a drive connection for said crank, a clutch intermediate said drive and crank, permitting the acceleration of the descent of the plunger by gravity, a lost-motion connection for said pitman, permitting the continued rotation of said crank after the arrest of said plunger in its downward movement, and means for automatically disengaging said clutch before the limit of lost motion in the return movement of the pitman is reached, whereby said plunger remains in lowered position within the mold.

8. In a machine for molding plastic material, the combination with a mold, of a vertically-reciprocating plunger, a pitman and a crank connection for actuating said plunger, a drive connection for said crank and a clutch intermediate said drive and crank, permitting the acceleration of the descent of the plunger by gravity, a lost-motion connection for said pitman permitting continued rotation of the crank after the arrest of said plunger, means for automatically disengaging said clutch before the limit of lost motion is reached in the upward movement of the pitman, means for again automatically disengaging said clutch after reëngagement before said crank has passed the upper dead-center, and means for preventing backward rotation of the crank.

9. In a machine for molding plastic material, the combination with a mold, of a vertically reciprocating plunger, a pitman and crank connection for actuating said plunger, a drive connection for said crank, a clutch intermediate said drive and crank permitting acceleration of the descent of the plunger by gravity, means for automatically disengaging said clutch before the upward movement of said plunger, means for raising said mold to disengage the same from the compressed brick, and means for automatically locking said plunger to hold the same from movement during the raising of said mold.

10. In a machine for compressing plastic material, the combination with a mold, of a reciprocating plunger for compressing the material within the mold actuated by gravity in its compression-stroke, means for raising the plunger after compression, means for raising the mold during the arrest of said plunger to disengage the compressed block, and means for automatically locking said plunger from movement during the raising of said mold, and for unlocking the same at the completion of the raising of said mold.

11. In a machine for compressing plastic material, the combination with a mold, a plurality of pallets or bottom plates therefor, a laterally-reciprocating carrier for filling the mold with plastic material, and a vertically-reciprocating plunger for compressing the plastic material within said mold against the pallet, of timed mechanism for effecting successively in each cycle, the locking of the plunger in its lowered position, the raising of the mold, the unlocking of the plunger the feeding of one pallet from beneath the mold and another pallet in registration therewith, the raising of the plunger, the reciprocation of the carrier to fill the mold and the arrest of the timed mechanism; independently-controlled means for effecting the downward movement of the plunger, and means whereby one or more succeeding operations of the plunger may be accomplished while the automatic mechanism remains stationary.

12. In a machine for molding plastic material, the combination with a bed and a vertically-reciprocating plunger, of simultaneously coöperatively adjustable side plates for varying the width of the space for the mold-cavity.

13. In a machine for molding plastic material, the combination with a bed and a vertically-reciprocating plunger, of a plurality of pallets or bottom plates, an endless chain for feeding said pallets periodically, longitudinally of the bed, in and out of registration with said plunger, and a mold-box containing a series of separate molds extending longitudinally of the bed.

14. In a machine for compressing plastic material, the combination with a bed, of a vertically-reciprocating plunger, a laterally-reciprocating carrier for the plastic material, a laterally-adjustable side plate for varying the width of the mold-cavity above said bed, and a wing or plate integral with said side plate forming a bottom for said carrier.

In testimony whereof I affix my signature in presence of two witnesses.

EBENEZER W. RIDER.

Witnesses:
EDWARD D. AULT,
JAS. P. BARRY.